US011171856B2

(12) United States Patent
Kumar et al.

(10) Patent No.: US 11,171,856 B2
(45) Date of Patent: Nov. 9, 2021

(54) DISTRIBUTED TIMESTAMPING IN NETWORKS

(71) Applicant: Intel IP Corporation, Santa Clara, CA (US)

(72) Inventors: Pradeep Kumar, Bangalore (IN); Amit Badole, Bangalore (IN); Arumugam Vijayaraman, Bangalore (IN); Helmut Reinig, Isen (DE); Patrik Eder, Taufkirchen (DE); Vladimir Todorov, Munich (DE); Abhiram Anantharamu, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 822 days.

(21) Appl. No.: 15/835,393

(22) Filed: Dec. 7, 2017

(65) Prior Publication Data

US 2019/0036803 A1 Jan. 31, 2019

(51) Int. Cl.
*H04L 12/26* (2006.01)
*H04J 3/06* (2006.01)
*G06F 1/04* (2006.01)
*H04L 12/841* (2013.01)
*G06F 1/14* (2006.01)

(52) U.S. Cl.
CPC ............. *H04L 43/106* (2013.01); *G06F 1/04* (2013.01); *G06F 1/14* (2013.01); *H04J 3/0667* (2013.01); *H04J 3/0697* (2013.01); *H04L 47/28* (2013.01); *H04J 3/0664* (2013.01)

(58) Field of Classification Search
None
See application file for complete search history.

(56) References Cited

U.S. PATENT DOCUMENTS

| 2013/0028265 | A1* | 1/2013 | Ronchetti | H04J 3/0697 370/400 |
| 2018/0115478 | A1* | 4/2018 | Kim | H04N 21/4305 |

* cited by examiner

*Primary Examiner* — Ayaz R Sheikh
*Assistant Examiner* — Sori A Aga
(74) *Attorney, Agent, or Firm* — Spectrum IP Law Group LLC

(57) ABSTRACT

An apparatus is provided which comprises: a first network interface (NI) to receive data from a source; a second NI coupled to a target; and a circuitry to generate a sequence of source timestamps and a sequence of target timestamps, wherein the first NI is to receive the sequence of source timestamps, and associate a first source timestamp of the sequence of source timestamps with the data, and wherein the second NI is to receive: the data with the first source timestamp from the first NI and the sequence of target timestamps from the circuitry, the second NI to generate a timestamp for the data, based at least in part on the first source timestamp and a first target timestamp of the sequence of target timestamps.

20 Claims, 8 Drawing Sheets

DISTRIBUTED TIMESTAMPING IN NETWORKS

BACKGROUND

Timestamping of a packet, for example, provides an indication of a time at which the packet is received by a component (or generated by the component). Timestamping may be used, for example, for debugging a system. For accurate timestamping, the timestamps may have relatively large number of bits. However, communicating timestamps with a large number of bits from a source to a target may, for example, consume relatively large bandwidth, and may possibly create congestion between the source and the target.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
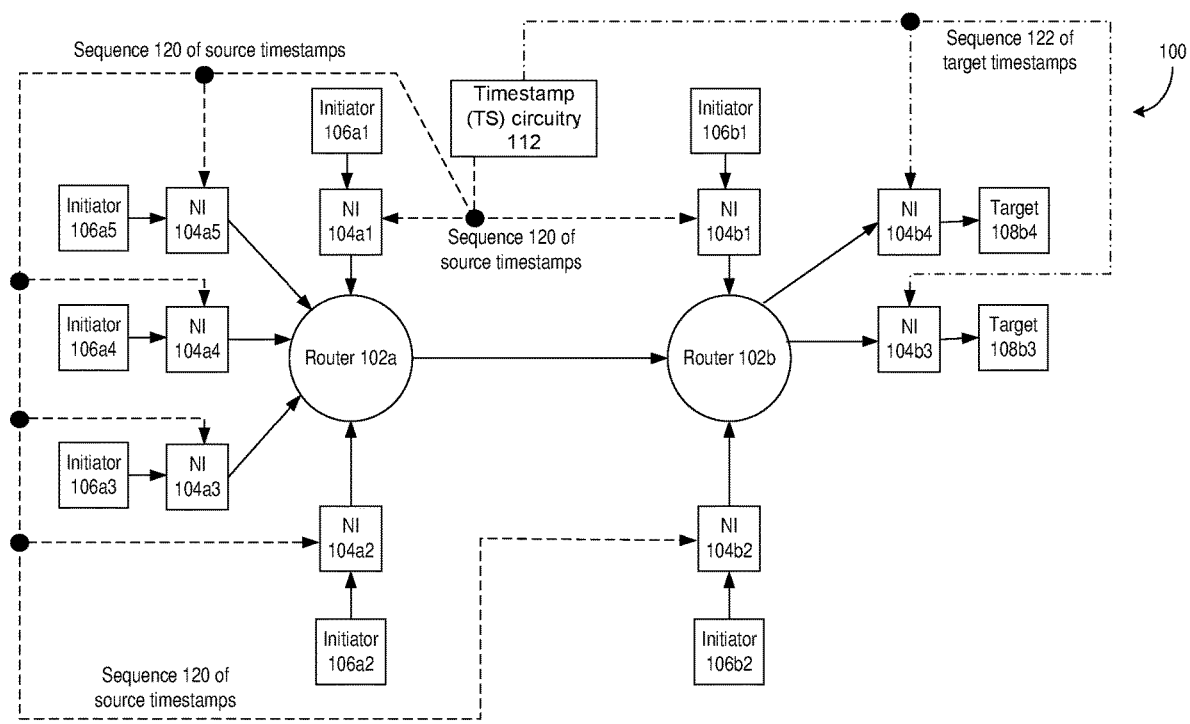
FIG. 1 schematically illustrates a network comprising a plurality of network interfaces, wherein a first network interface coupled to a target receives data from a second network interface coupled to an initiator, and wherein a timestamp associated with the data is generated in a distributed manner, according to some embodiments.

In some embodiments, a distributed time stamping may be implemented. For example, a source network interface (NI) may receive packets from a source, and may transmit the packets to a target NI coupled to a target. A centralized counter may transmit a sequence of source time stamps to the source NI (e.g., along with transmitting to multiple other source NIs), and transmit a sequence of target time stamps to the target NI (e.g., along with transmitting to multiple other target NIs).

In some embodiments, to timestamp a packet (or a group of packets), the source NI may select a specific source time stamp (e.g., of the sequence of source time stamps) that is substantially simultaneously received with the packet in the source NI. The source NI may then transmit the selected source time stamp, along with the packet, to the target NI.

In some embodiments, the target NI may receive the packet, along with the source time stamp, substantially simultaneously with a specific target time stamp of the sequence of target time stamps. The target NI may then generate a time stamp for the packet, where the specific source time stamp may form Least Significant Bits (LSBs) of the time stamp, and the specific target time stamp may form Most Significant Bits (MSBs) of the time stamp.

Thus, the centralized counter has to transmit the sequence of source time stamps to the source NI, and transmit a sequence of target time stamps to the target NI. Assume that the time stamp is of P bits, individual target time stamps are Q bits, and hence, individual source time stamps are (P-Q) bits. Thus, the source NI has to transmit the (P-Q) bit source time stamps to the target NI. In contrast, in a system that do not employ distributed generation of timestamps, a source NI would have generated and transmitted the entire P bit timestamp to the target NI. Thus, various embodiments of the disclosure result in less bandwidth usage for transmission of timestamping from source NIs to target NIs (e.g., as merely (P-Q) bit timestamps, and not P bit timestamps, are being transmitted), less congestion between the source NIs and target NIs, etc. Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on." The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C). The terms "left," "right," "front," "back," "top," "bottom," "over," "under," and the like in the description and in the claims, if any, are used for descriptive purposes and not necessarily for describing permanent relative positions.

FIG. 1 schematically illustrates a network 100 comprising a plurality of network interfaces, wherein a first network interface coupled to a target receives data from a second network interface coupled to an initiator, and wherein a timestamp associated with the data is generated in a distributed manner, according to some embodiments.

In some embodiments, the network 100 comprises routers 102a and 102b. In some embodiments, each of the routers 102a, 102b may be coupled to a corresponding plurality of network interfaces (NIs). For example, the router 102a is coupled to NIs 104a1, 104a2, 104a3, 104a4, and 104a5, and the router 102b is coupled to NIs 104b1, 104b2, 104b3, and 104b4.

Elements referred to herein with a common reference label followed by a particular number or alphabet may be collectively referred to by the reference label alone. For example, routers 102a and 102b may be collectively and generally referred to as routers 102 in plural, and router 102 in singular. Similarly, network interfaces 104a1, . . . , 104a5, 104b1, . . . , 104b may be collectively and generally referred to as network interfaces 104 in plural, and network interface 104 in singular. Similarly, network interfaces 104a1, . . . , 104a5 may be collectively and generally referred to as network interfaces 104a in plural, and network interface 104a in singular.

In some embodiments, individual NI 104 may be coupled to a corresponding one of an initiator 106 or a target 108. Merely as examples, the NI 104a1 is coupled to an initiator 106a1, the NI 104a2 is coupled to an initiator 106a2, the NI 104a3 is coupled to an initiator 106a3, the NI 104a4 is coupled to an initiator 106a4, the NI 104a5 is coupled to an initiator 106a5, the NI 104b1 is coupled to an initiator 106b1, and the NI 104b2 is coupled to an initiator 106b2. Merely as examples, the NI 104b3 is coupled to a target 108b3, and the NI 104b4 is coupled to a target 106b4.

Although FIG. 1 illustrates seven NIs being coupled to seven corresponding initiators and two NIs being coupled to two corresponding targets, a different number of NIs may be coupled to the initiators and a different number of NIs may be coupled to the targets. Although not illustrated in FIG. 1, in an example, a NI may not be coupled to any of a target or an initiator.

An initiator 106 may be an initiator or source of data, and a target may be a consumer of data. In some embodiments, the role of an initiator and a target may be interchangeable. For example, an initiator 106 may act as a target 108, and vice versa. For example, a component coupled to a NI 104 may act as an initiator, as a target, and/or as a combination of an initiator and a target. The components 106 and 108 are labelled specifically as initiator and targets merely for explaining the principles of this disclosure. In this disclosure, an initiator 106 may also be referred to as a data source, simply a source.

A NI 104 coupled to an initiator 106 may also be referred to as a source NI, data originating NI, originating NI, initiator NI, and/or the like. A NI 104 coupled to a target 108 may also be referred to as a destination NI, a target NI, and/or the like.

Assume, for example, that an initiator (e.g., the initiator 106a5) is to transmit data to a target (e.g., target 108b4). In an example, such data may be transmitted from the initiator 106a5, via the NI 104a5, routers 102a, 102b, NI 104b4, to the target 108b4.

Although the network 100 may comprise more than two routers, merely two are illustrated in FIG. 1 for purposes of illustrative clarity. Although the routers 102a, 102b are illustrated to be respectively coupled to five and four NIs, such numbers are merely examples, and routers 102a, 102b may be respectively coupled to any appropriate numbers of NIs. In the example illustrated in FIG. 1, a single data transmission path exists between a specific initiator and a specific target. However, in some embodiments (e.g., where more than two routers are present), two or more parallel data transmission paths may exist between a specific initiator and a specific target. Thus, in some embodiments, a topology of the network 100 (e.g., interconnection between various routers and NIs, number of routers and/or NIs, etc.) may be different from that illustrated in FIG. 1.

In some embodiments, individual ones of the initiators 106 and/or the targets 108 may be any appropriate component, e.g., processors, processing cores, memory, memory controller, Input/Output ports such as Universal Serial Bus (USB) ports, Peripheral Component Interconnect Express (PCIe) ports, Direct memory access (DMA) controllers, external testing apparatus (e.g., that may be external to the network 100, although not illustrated to be external in FIG. 1), and/or any other appropriate component.

In some embodiments, the network 100 may communicate user data (e.g., data that may be communicated for general operation of the network 100, the initiators 106, and/or the targets 108). Merely an example, user data may comprise data read from a memory, to be written to a memory, data used by processors for operation of the processors, etc.

In some embodiments, in addition to, or instead of, communicating user data, the network 100 may communicate trace data. Trace data may comprise trace information, debug information, etc., from an initiator 106. For example, trace data may be transmitted to an external test arrangement (e.g., the external test arrangement may be a target 108, or may be coupled to a target 108). Merely as examples, trace data associated with a user data packet travelling via a NI 104 (or an associated initiator) may comprise trace statistics such as a destination port of the user data packet, a source port of the user data packet, a type of instruction associated with the user data packet (e.g., whether the user data packet is associated with a read request, a write request, a completion request, etc.). In another example, the trace data associated with the user data packet travelling via the NI 104 (or an associated initiator) may comprise a copy of the header of the packet. In yet another example, a trace port in a router may be configured to maintain a count of packets traversing through individual (or all) the data ports of the router, maintain a count or history of various configuration information of such packets, etc., and output such information as trace data. Trace data may comprise any other appropriate or relevant information associated with tracing one or more user data packets.

In some embodiments, an initiator (e.g., initiator 106a5) may transmit first data (e.g., comprising one or more first data packets) to a target (e.g., target 104b4), and another initiator (e.g., 106b1) may transmit second data (e.g., comprising one or more second data packets) to the target. The data transmission path from the initiator 106a5 to the target 108b4 is longer than the data transmission path from the initiator 106b1 to the target 108b4. Also, the two data transmission paths may experience different latencies or delays in transmitting the first and second data to the target 108b4. Thus, the first data and the second data may have different transmission times for reaching the target 108b4.

In some embodiments, it may be useful to associate timestamps with the data received by a target 108. For example, in the above example of the first data and the second data, a first timestamp may be associated with the first data and a second timestamp may be associated with the second data. A timestamp associated with data may be indicative of a time the data was originally received at a source NI 104. For example, as the first data was transmitted from the initiator 106a5 to the 104b4, a first timestamp may be indicative of a time the first data was received at the source NI 104a5 from the initiator 106a5. Similarly, a second timestamp may be indicative of a time the second data was originally received at the source NI 104b1 from the initiator 106b1.

In some embodiments, the network 100 may implement parallel timestamping. Parallel tracing may enable application of timestamps that depict relative times at which various events (e.g., arrival of data at a NI) occur in multiple initiators and/or source NIs. For example, in the above example of first data and second data, the first and second timestamps reveal which of the first or second data was first received by the respectively source NI.

In some embodiments, sections of the timestamps are generated by a timestamp (TS) circuitry 112 (also referred to herein as "circuitry 112"). For example, for the first timestamp associated with first data transmitted from the NI 104a5 to the NI 104b4, a first section of the first timestamp may be applied by the NI 104a5 (e.g., by the source NI), and a second section of the first timestamp may be applied by the NI 104b4 (e.g., by the target NI). As an example, the first section of the first timestamp may be one or more Least Significant Bits (LSBs) of the first timestamp, and the second section of the first timestamp may be one or more Most Significant Bits (MSBs) of the first timestamp.

For example, the source NIs 104 (e.g., NIs 104a1, 104a5, 104b1, 104b2) receive a sequence 120 of first sections of timestamps. The first sections of the timestamps are also referred to herein as source timestamps. Thus, the source NIs 104 may receive the sequence 120 of source timestamps from the circuitry 112.

The target NIs 104 (e.g., NIs 104b3, 104b4) receive a sequence 122 of second sections of timestamps. The second sections of the timestamps are also referred to herein as target timestamps. Thus, the target NIs 104 may receive the sequence 122 of target timestamps from the circuitry 112.

Thus, the circuitry 112 generates the sequences 120 and 122, and transmits the two sequences respectively to two different types of NIs (although in some embodiments, where an initiator may also act as a target, a corresponding NI may receive both the sequences 120 and 122).

Figure 2:
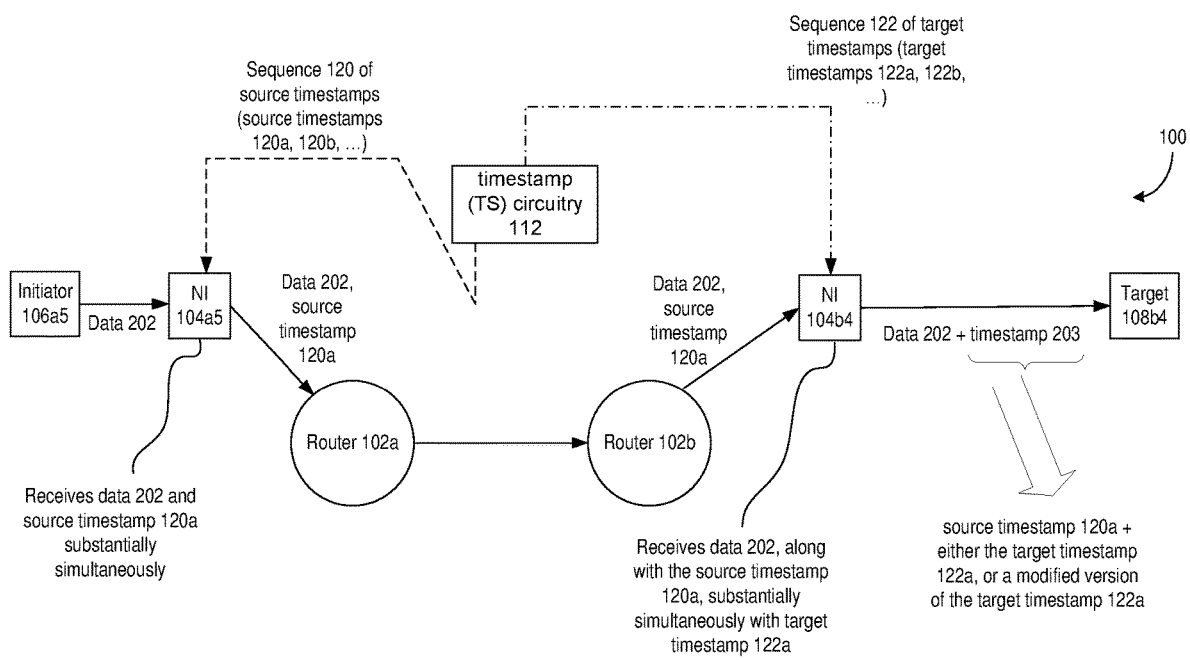
FIG. 2 illustrates an example operation of the network of FIG. 1, according to some embodiments.

FIG. 2 illustrates an example operation of the network 100 of FIG. 1, according to some embodiments. For purposes of illustrative clarity, only certain relevant components of the network 100 are illustrated in FIG. 2. In FIG. 2, assume that an initiator (e.g., initiator 106a5) may transmit data 202 (which may be trace data, for example) to a target (e.g., target 108b4). Let the sequence 120 comprise source timestamps 120a, 120b, 120c, and so on. Assume that the source NI 104a5 receives the source timestamp 120a from the sequence 120, substantially simultaneously with receiving the data 202 from the initiator 106a5. For example, when receiving the data 202, the NI 104a5 may initially receive a start-up message associated with the data 202 from the initiator 106a5. In some embodiments, the source NI 104a5 receives the source timestamp 120a from the sequence 120, e.g., substantially simultaneously with receiving the start-up message associated with the data 202 from the initiator 106a5. In some embodiments, the source NI 104a5 associates the source timestamp 102a with the data 202, and transmits the data 202, along with the source timestamp 102a, to the target NI 104b4.

Let the sequence 122 comprise target timestamps 122a, 122b, 122c, and so on. Assume that the target NI 104b4 receives the data 202 (e.g., along with the source timestamp 120a) substantially simultaneously with receiving the target timestamp 122a of the sequence 122. The target NI 104b4 may generate a timestamp 203 for the data 202, based on the source timestamp 120a and the target timestamp 122a (or a modified version of the target timestamp 122a, e.g., for reasons discussed herein later). For example, target NI 104b4 may concatenate, augment, or combine the source timestamp 120a and the target timestamp 122a (or the modified version of the target timestamp 122a), to generate the timestamp 203. For example, the source timestamp 120a may form LSBs of the timestamp 203, and the target timestamp 122a (or the modified version of the target timestamp 122a) may form MSBs of the timestamp 203. The target NI 104b4 then transmits the data 202 and the timestamp 203 to the target 108b4.

Assume, for example, that the source timestamp 120a of the timestamp 203 has N bits and the target timestamp 122a has (M-N) bits (e.g., the timestamp 203 has M bits). Thus, the timestamp 203 has M bits, but merely N bits are being transmitted from the source NI to the target NI via the routers 102. In a conventional system in which M bit timestamp may be used, the entire M bit timestamp may be applied at originating network interface—in such a case, the entire M bit timestamp may have to be transmitted from the originating network interface to a target network interface over one or more routers, thereby possibly creating congestion and delay over the routers, and there also necessitating larger bandwidth. In contrast, in the network 100, merely N bits are being transmitted from the source NI to the target NI via the routers 102, which may require less bandwidth, and may create less congestion or delay (e.g., compared to the conventional system). The remaining (M-N) bits of the timestamp 203 may be applied in the destination or target NI.

Figure 3:
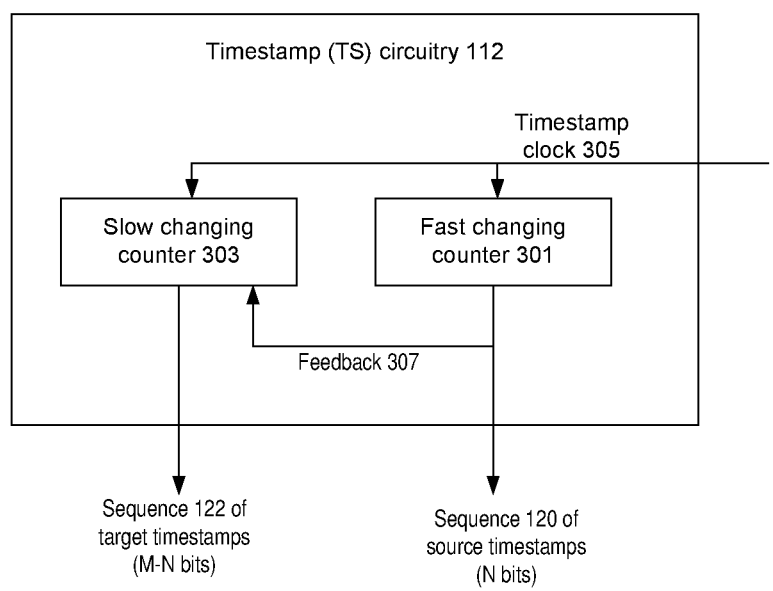
FIG. 3 illustrates a timestamp circuitry, according to some embodiments.

FIG. 3 illustrates the timestamp circuitry 112 of the network 100 of FIG. 1, according to some embodiments. In some embodiments, the circuitry 112 may comprise a fast changing counter 301 and a slow changing counter 303. The counters 301 and 303 may receive a timestamp clock signal 305. In an example, a frequency of the clock 305 may be at least as high as a maximum operating frequency of all the initiators 106 (e.g., to maintain accuracy and parallel timestamping in the network 100).

In some embodiments, the counters 301 and 303 may be gray counters (e.g., instead of being a binary counters), e.g., may use reflected binary code (RBC), also known as reflected binary (RB) or Gray code. In an example, gray code may be used for the counters 301 and 303, e.g., to help in easy synchronization across clock domains, as merely one-bit changes in gray coding format while the count value is incremented once. In some other embodiments, binary code may also be used for the counters 301 and 303.

In some embodiments, the counter 301 may change or increment with every clock cycle of the clock 305. For example, if a M bit timestamp is to be implemented, then the counter 301 may generate N bit sequence 120 and the counter 303 may generate the (M-N) bit sequence 122.

When the counter 301 reaches a maximum value for it's N bits, the counter 301 may be reset (e.g., the counter 301 wraps around), and the counter 303 may be incremented. For example, for a counter that counts in accordance with the gray code, the counter "wraps around" (e.g., resets from a maximum value to zero) when the MSB of the counter transitions from "1" to "0." Thus, when the counter 301 wraps around, the MSB of the counter 301 (e.g., the $N^{th}$ bit or MSB of the counter 301) transitions from 1 to 0.

Thus, in combination, the counters 301 and 303 form a M bit gray code counter, with the counter 301 providing N bit LSBs and the counter 303 providing (M-N) bits MSB of the combined M bit gray code counter. As discussed with respect to FIG. 1, the sequence 122 output by the counter 303 may be transmitted to the NIs 104 coupled to the targets 108, and the sequence 120 output by the counter 301 may be transmitted to the NIs 104 coupled to the initiators 106.

Thus, referring to FIGS. 1-3, a timestamp (e.g., timestamp 203) is split in two parts—(i) source timestamp 120a applied by a source NI, which forms LSBs of the timestamp, and (ii) target timestamp 122a applied by a target NI, which forms MSBs of the timestamp. The source timestamp 120a indicates arrival time of the data 202 at the source NI, and target timestamp 122a indicates arrival time of the data 202 at the target NI. Together, the source timestamp 120a and the target timestamp 122a may form one accurate timestamp value for the data.

The counters of the circuitry 112 (e.g., the counters 301 and 303) may operate on a maximum clock frequency of all the initiators 106, e.g., to be able to attach an accurate timestamp to various events at the initiators 106. Using a lower frequency (e.g., than the maximum frequency of the initiators 106) may result in, for example, two almost simultaneous events at two initiators having equal timestamps (or inconsistent timestamps).

In very general terms and in a rudimentary manner, the source timestamps and the target timestamps may be somewhat analogues to the concept of minutes and seconds. Merely as example (e.g., merely to explain the principles of this disclosure), the source timestamps 120 may correspond to keeping count of seconds, and the target timestamps 122 may correspond to keeping count of minutes. For example, assume that the events occur at two source NIs, one at 1 minute 10 seconds and another at 1 minute 12 seconds. The source timestamps 120 may keep track of the seconds (e.g., 10 and 12, respectively) during which the events occurred, while the target timestamps 122 may keep track of the minute (e.g., 1 minute) during which the events occurred. The combination of the source timestamps 120 and the target timestamps 122 may then indicate that the two events respectively occurred at 1 minute 10 seconds, and at 1 minute 12 seconds. Of course, in practice, the counters 301 and 303 are much faster than minutes and seconds.

Figure 4:
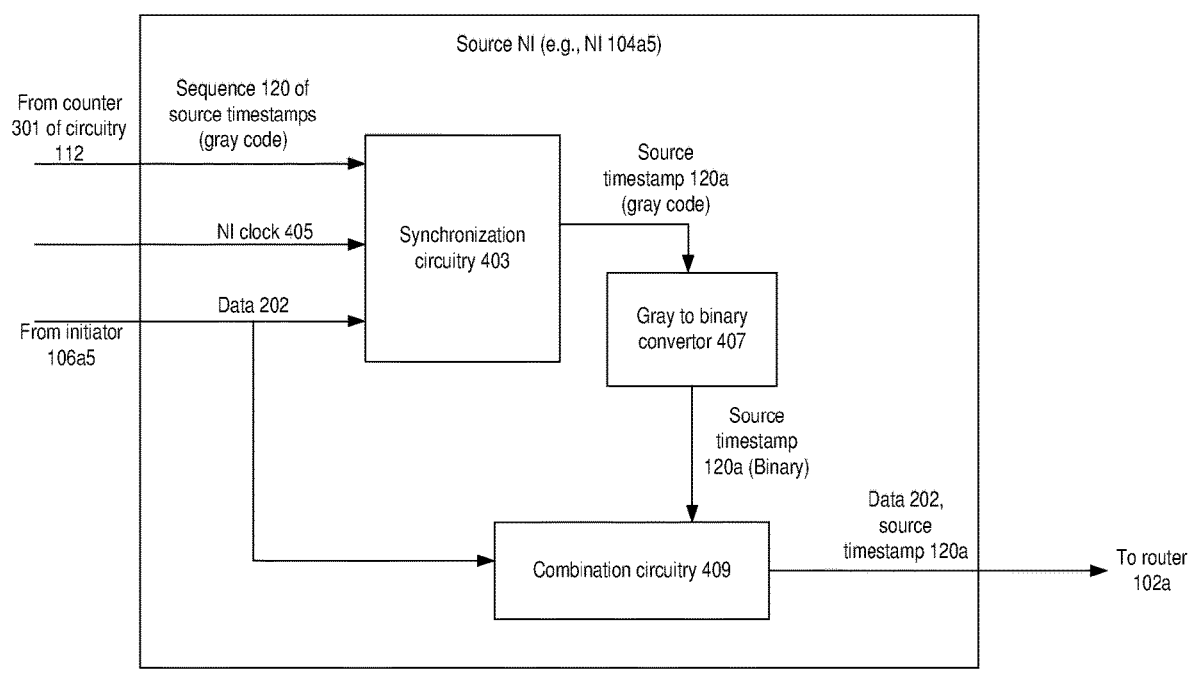
FIG. 4 illustrates an example source Network Interface (NI) of the network of FIG. 1, according to some embodiments.

FIG. 4 illustrates an example source NI (e.g., NI 104a5 coupled to the initiator 106a5) of the network 100 of FIG. 1, according to some embodiments. In some embodiments, the NI 104a5 comprises a synchronization circuitry 403 (also referred to as circuitry 403) that receives the sequence 120 of source timestamps, a NI clock 405, and a stream of data from the initiator 106a5 (e.g., data 202 is illustrated in FIG. 4). In an example, the sequence 120 is in gray code (although in some other examples, the sequence 120 may be in binary code). The circuitry 403 synchronizes arrival of the data 202 with one of the source timestamps in the sequence 120.

For example, when receiving the data 202, the NI 104a5 may initially receive a start-up message associated with the data 202 from the initiator 106a5. In an example, the circuitry 403 receives the source timestamp 120a of the sequence 120 substantially simultaneously with receiving the start-up message associated with the data 202 from the initiator 106a5. Accordingly, the circuitry 403 may output the source timestamp 120a from the sequence 120 for the data 202.

In some embodiments, the NI 104a5 may also comprise a gray to binary converter 407, which may convert the gray coded source timestamp 120a to a corresponding binary coded source timestamp.

In some embodiments, the NI 104a5 may also comprise a combination circuitry 409, which may combine the data 202 and the binary coded source timestamp 120a, and may transmit the combined data 202 and the binary coded source timestamp 120a to the router 102a. If, for example, the combined data has fields for both source timestamp and target timestamp, the field for the target timestamp may be filled with "don't care" values (e.g., all zeros, all ones, or other predetermined or random values).

Figure 5:
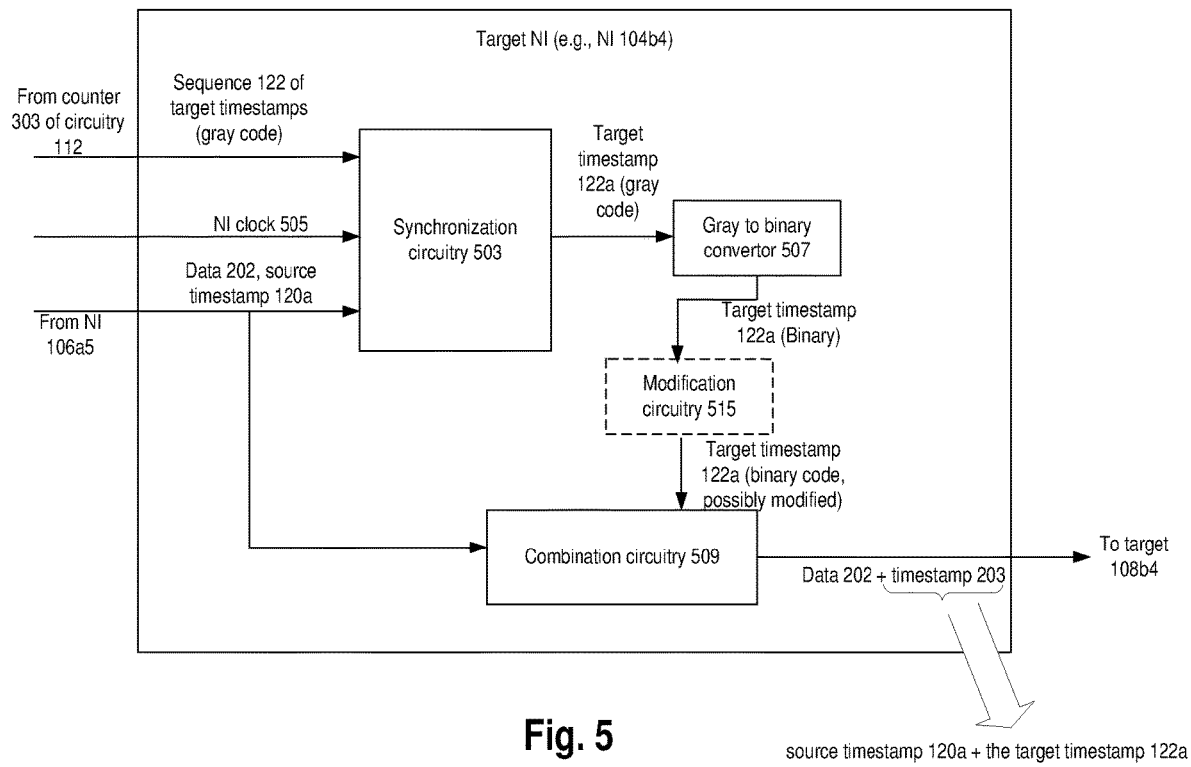
FIG. 5 illustrates an example target NI of the network of FIG. 1, according to some embodiments.

FIG. 5 illustrates an example target NI (e.g., NI 104b4 coupled to the target 108b4) of the network 100 of FIG. 1, according to some embodiments. In some embodiments, the NI 104b4 comprises a synchronization circuitry 503 (also referred to as circuitry 503) that receives the sequence 122 of target timestamps, a NI clock 505, and a stream of (data+source timestamps) from one or more initiators (e.g., the data 202+source timestamp 120a from initiator 106a5 and NI 104a5 of FIG. 4). In an example, the sequence 122 is in gray code (although in some other examples, the sequence 122 may be in binary code).

The circuitry 503 synchronizes arrival of the data 202, along with the source timestamp 120a, with one of the target timestamps in the sequence 122. In an example, the circuitry 503 receives the target timestamp 122a of the sequence 122 substantially simultaneously with receiving the data 202 (e.g., along with the source timestamp 120a) from the NI 104a5. Accordingly, the circuitry 503 may output the target timestamp 122a from the sequence 122 for the data 202, where the target timestamp 122a may be in the gray code format.

In some embodiments, the NI 104b4 may also comprise a gray to binary converter 507, which may receive the gray coded target timestamp 122a. The converter 507 may convert the gray coded target timestamp 122a to a binary coded target timestamp 122a.

In some embodiments, the NI 104b4 may also comprise a modification circuitry 515, which may selectively modify the binary coded target timestamp 122a. For example, the NI 104b4 may either modify, or not modify, the target timestamp 122a, based on one or more criteria (e.g., as discussed herein in further details later). Modification may involve decrementing the target timestamp 122a by one. Because the modification operation is selective (e.g., implemented upon fulfilment of one or more conditions), the circuitry 515 is illustrated is dashed line. In some embodiments, the locations of the circuitries 515 and 507 may be interchangeable.

In some embodiments, the NI 104b4 may also comprise a combination circuitry 509, which may combine the data 202, the source timestamp 120a, and the target timestamp 122a. For example, the source timestamp 120a and the target timestamp 122a may be combined to form the timestamp 203 (e.g., as discussed with respect to FIG. 2). The output of the circuitry 509 may be provided to the target 108b4.

In some embodiments, individual ones of the source timestamps of the sequence 120 has to have a minimum number of bits. For example, referring again to FIG. 3, in some embodiments, the fast changing source timestamp counter 301 has to have sufficient bits, e.g., so that the counter 301 may not wrap around twice during the propagation time of data (e.g., data 202) over the network 100 from a source NI to a target NI, e.g., not even in worst case scenarios. If the counter 301 has such sufficient bits, then software post-processing may be able to correct any potential race conditions that may occur when source timestamps from different source NIs get interleaved while arriving at the target NI. Under such a precondition, the target timestamp value attached may be off by at most one source timestamp wrap around, e.g., at most one target timestamp increment.

In some embodiments, the reduction of the source timestamp bits to a minimum number (e.g., a minimum number for covering worst case network propagation time) may significantly reduce a number of source timestamp wires to be propagated all over the network 100 (e.g., from the circuitry 112 to the source NIs 104), which may result in reduced congestion, reduced complexity in layout of wires, reduced number of synchronizer flops for the clock-domain crossing of the gray-coded values, area and leakage power benefits, etc.

Adding the missing target timestamp bits for accurate timestamps over a complete debug time interval (e.g., where the debug time interval is a time period over which the network and various components are to be debugged, and when the trace data provides the desired human readable timestamps to correlate the timing of all traces, such as data 202, are to be transmitted to a target such as a test equipment) may be desired for parallel timestamping. The addition of the target timestamp bits can be done either at the target NI by hardware or by post-processing software at the target from the collected data information (e.g., containing timestamp overflow packets).

In some embodiments, a criterion for having a minimum or near minimum number of bits for the fast changing counter 301 is that the source timestamp may have at most one wrap around during a worst case transmission time of data from any source NI to a target NI. The following operations may be used to calculate a minimum number of bits for the fast changing gray coded LSB counter 301. The operations are based on a Round Robin Scheme.

Operation 1:
Estimate a Maximum Worst case Re-Arbitration Delay for a router 102 to route data from a source NI to a target NI.

$$\text{Worst Arbitration Delay of a router} = (1/\text{router operating frequency}) * \text{Total No. of sources NIs connected to all the routers} * \text{Maximum message size of the data} * \text{backpressure delay initiated from destination IP via Target.} \quad \text{Equation 1.}$$

$$\text{Maximum Worst Re-Arbitration Delay} = \text{Total No. of Routers to reach the target NI from a specific source NI} * \text{Worst Arbitration delay of the router.} \quad \text{Equation 2.}$$

Thus, the "Maximum Worst Re-Arbitration Delay" of equation 2 may represent a maximum or worst case time that a packet may take to reach any target NI from any source NI.

Operation 2:
Divide the Maximum Worst Re-Arbitration Delay of equation 2 by the source initiator's clock period. Let us assume the value is 'Y.'

Operation 3:
Solve the following equation for X:

$$(2X-Z)>Y \quad \text{Equation 3}$$

where X is the number of bits of the counter 301 and Z is a tolerance, which may take value of 2 or 4.

With sufficiently high clock speed of the circuitry 112 and post processing (e.g., either at a target NI, or at the target), the accuracy of equation 3 may fall within 10 nanoseconds (ns) of the actual timestamp value.

In some embodiments, the timestamp accuracy may be calculated as follows:

$$\text{Shortest Latency in Capture} = 1 \text{ clock cycle of circuitry } 112 + 1 \text{ clock cycle of an initiator clock} + \text{shortest source timestamp transport delay from the circuitry } 112 \text{ to the source NI.} \quad \text{Equation 4}$$

$$\text{Longest Latency in Capture} = 1 \text{ clock cycle of circuitry } 112 + 2 \text{ clock cycles of Initiator clock at the initiator} + \text{longest source timestamp transport delay from the circuitry } 112 \text{ to the source NI.} \quad \text{Equation 5.}$$

$$\text{Accuracy} = \text{Longest Latency in Capture} - \text{Shortest Latency in Capture} = 1 \text{ clock period of initiator clock} + \text{source timestamp transport delay variation.} \quad \text{Equation 6}$$

In an example, by appropriately selecting the clock speed of the circuitry 112, the clock speed of the initiators, and/or the number of bits in the counter 301, the achievable accuracy of the timestamp may be configured. If the frequency of the clock 305 is reduced below the speed of the initiators, then an accuracy of the broadcasted timestamp may limit the reachable accuracy.

In an example, as the gray-coded source timestamp sequence 120 are broadcasted to all source NIs, simple resynchronization to the source clock domain using multistage synchronizer flops may be used. Therefore, the source sequence 120 may be propagated without any timing constraints or necessity to have the individual bits routed with exactly the same wire delay.

In some embodiments, the circuitry 112 has to remain always on powered (e.g., if timestamping of data is desired). For example, individual initiators 106 may be clock or power switched off, e.g., without losing accuracy or consistency of the source timestamp values. In some embodiments, the functionality of the circuitry 112 and the timestamping may be independent of the clock frequencies of the initiators 106 and/or the targets 108. In some embodiments, the timestamping features of the network 100 may be capable of working with dynamic voltage and frequency switched designs.

In some embodiments and as discussed with respect to equations 1-3, the worst case propagation delay of data from any source NI to any target NI may be less than a time taken by the counter 301 to count from zero to its highest value. A wrap around time of the counter 301 may be the time taken by the counter 301 to count from zero to its highest value (e.g., time between two wrap arounds of the counter 301, or time between consecutive increments of the counter 303). In some embodiments, the number of bits in the counter 301 may be selected such that the worst case propagation delay of data from any source NI to any target NI may be less than half the wrap around time. This, for example, may ensure that the counter 303 is not incremented twice by the time the data 202 originates from a source NI and reaches a target NI.

In other words, this, for example, may ensure that the counter 303 is incremented at most once by the time the data 202 originates from a source NI and reaches a target NI In an example, there may be possible race scenarios. For example, assume that two different source NIs capture first and second data, respectively, substantially simultaneously (or at rapid succession), e.g., when the wrap around of the counter 301 occurs. Due to the jitter of the clock 305 or due to synchronization issues, for example, the first data may be captured by a first source NI at 0xFFFF of the source timestamp (e.g., at the end count of the counter 301 just before the wrap around), and the second data may be captured by a second source NI at 0x0000 of the source timestamp (e.g., at the beginning of the counter 301 immediately after the wrap around). Although the two data capture events occurred at about the same time (or the second data was captured by the second source NI immediately after the first data was captured by the first source NI), the source timestamps may be drastically different for the two data (e.g., one at 0x0000, and another at 0xFFFF). For example, without some correction, the target NI may assign the same target timestamps for the two data capture events, and the two data capture events may differ considerably (e.g., due to the considerable difference in the source timestamps). In some embodiments, to avoid such situations, corrections may be performed by the modification circuitry 515 of the target NI, as discussed herein in further details later. The above example associated with the first data and the second data is referred to herein as an example of a "first race condition."

Assume another scenario during which two data capture events associated with data A and data B (e.g., by two respectively source NIs) may be substantially at the same time, and the two data capture events may have the same source timestamps. Assume that data A is received by a target NI just before an increment of the target timestamp, and data B is received by the target NI just after the increment of the target timestamp (e.g., due to different propagation times taken by data A and data B to reach the target NI). Accordingly, the two data capture events associated with data A and data B may be assigned different target timestamps, although they should have been assigned the same target timestamp (e.g., because they occurred at the same time). The above example associated with the data A and data B is referred to herein as an example of a "second race condition." In some embodiments, to avoid such situations (e.g., assignment of two different target timestamps), corrections may be performed by the modification circuitry 515 of the target NI, as discussed herein in further details later.

In some embodiments, the number of bits in the counter 301 is selected such that the worst case propagation delay of data from any source NI to any target NI may be less than half the wrap around time of the counter 301. In some embodiments (e.g., to avoid the above discussed first and second race conditions), in addition to the circuitry 112 transmitting the sequence 122 of the target timestamps to the target NIs, the circuitry 112 may also transmit MSBs 620 of individual source timestamps of the sequence 120 to the target NIs as well.

Figure 6:
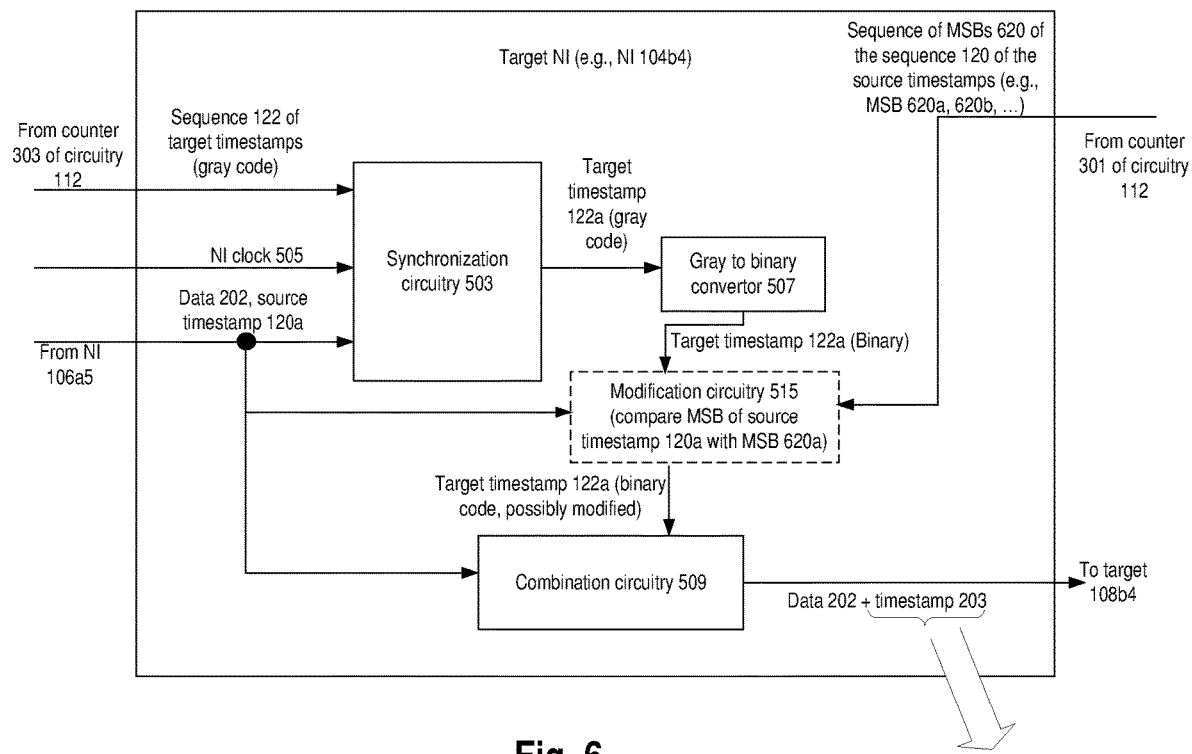
FIG. 6 illustrates an arrangement to remedy possible race conditions in the network of FIG. 1, where a target NI receives a Most Significant Bit (MSB) of individual source timestamps of a sequence of source time stamps to counter possible race conditions, in accordance with some embodiments.

For example, FIG. 6 illustrates an arrangement to remedy possible race conditions in the network 100 of FIG. 1, where a target NI (e.g., the target NI 104b4) may receive MSBs 620 of individual source timestamps of the sequence 120 to counter possible race conditions, in accordance with some embodiments. FIG. 6 is substantially similar to FIG. 5, and the discussion with respect to FIG. 5 may also apply to FIG. 6. In FIG. 6, additionally, the target NI 104b4 (e.g., the modification circuitry 515) receives MSBs 620 of individual source timestamps of the sequence 120. For example, if the sequence 120 comprises source timestamps 120a, 120b, 120c, and so on, then the sequence of MSBs 620 comprises an MSB of each of the source timestamps 120a, 120b, 120c, and so on. The transmission of the MSBs 620 to a target NI may be along with transmission of the sequence 122 of the target timestamps, to form redundancy for error detection and correction.

In some embodiments, the modification circuitry 515 operates to selectively decrement the target timestamp 122a by one, e.g., based on a condition. For example, assume that the target timestamp 122a is received by the target NI 104b4 substantially simultaneously with receiving a MSB 620a of the sequence of MSBs 620. The circuitry 515 compares the MSB of the source timestamp 120a with the MSB 620a. If the two MSBs match, then the circuitry 515 does not perform any modification operation. However, if the MSB of the source timestamp 120a does not match the MSB 620a, then the circuitry 515 decrements the target timestamp 122a, e.g., for reasons discussed herein below.

In the previously discussed first race condition, the first source timestamp of 0xFFFF for the first data may have a MSB of 1, and the second source timestamp of 0x0000 for the second data may have a MSB of 0, In an example, it may be guaranteed that the two substantial simultaneous messages (e.g., the first data with the first source timestamp of 0xFFFF, and the second data with the second source timestamp of 0x0000) on arrival at the target NI 104b4 may be initially assigned the same target timestamp by the synchronization circuitry 503. This may be because both messages started just when the target timestamp counter 303 had an increment (e.g., note that the number of bits in the counter 301 is selected such that the worst-case propagation delay of data from any source NI to any target NI may be less than half the wrap around time of the counter 301, or half the time it takes for the counter 303 to increment). Now, the MSBs (e.g., MSB 620a) of the gray code source timestamps may be 0 (e.g., the MSB sequence 620 may be all zeros) when the first data and the second data are received at the target NI 104b5 (e.g., as the worst-case propagation delay of data from any source NI to any target NI is less than half the time it takes for the counter 303 to increment). Thus, the target timestamp associated with the second data (e.g., with the second source timestamp of 0x0000) may not be decremented by the modification circuitry 515 (e.g., as the MSB of the second source timestamp of 0x0000 is 0, and the MSB 620 may be 0). However, the target timestamp associated with the first data (e.g., with the first source timestamp of 0xFFFF) may be decremented by the modification circuitry 515 (e.g., as the MSB of 0xFFFF may be 1 in gray code, and the MSB 620a may be 0). Thus, as the target timestamp associated with the first data (e.g., with the first source timestamp of 0xFFFF) is decremented by one the circuitry 515, the difference between the final timestamps of the first data and the second data may be merely a single clock cycle of the counter 301, e.g., thereby resolving the above discussed first race condition. However, without the correction by the circuitry 515 (e.g., without the decrement of the target timestamp for the first source timestamp of 0xFFFF), the difference between these two near simultaneous events would have been considerable.

In the previously discussed second race condition, two simultaneous data (e.g., with similar source timestamps associated with data A and data B, respectively) are transmitted at the same time to, for example, the target NI 104b4.

Due to different propagation delays and arbitration choices, one may arrive before the increment of the target timestamp counter 303, and the other after the increment. Without any correction, this may result in considerable different in the final timestamp values (e.g., the LBS of the target timestamp would differ by one). However, the modification by the circuitry 515 may resolve the issue.

For example, because data A and data B are received at the target NI at about when the target timestamp is being incremented, data A and data B were transmitted when the source timestamp had MSB of 1 (e.g., because the number of bits in the counter 301 is selected such that the worst-case propagation delay of data from any source NI to any target NI is less than half the wrap around time of the counter 301). When data A is received by the NI 104b4 immediately prior to the increment of the target timestamp, the MSB 620a of the sequence 120 received by the circuitry 515 from the counter 301 is 1 (e.g., as the target timestamp is going to increment soon). Thus, both the MSB of the source timestamp of data A and the MSB 620a are 1, and hence, the target timestamp assigned to data A is not modified by the circuitry 515.

On the other hand, when data B is received by the NI 104b4 immediately after the increment of the target timestamp, the MSB 620a of the sequence 620 received by the circuitry 515 from the counter 301 is 0 (e.g., as the target timestamp counter 303 has just incremented, and the counter 301 has also been reset). Thus, the MSB of the source timestamp of data B is 1, while the MSB 620a is 0—hence, the target timestamp assigned to data B is decremented by the circuitry 515. Due to the decrement of the target timestamp assigned to data B, the final timestamps assigned to both data A and data B are the same, e.g., thereby resolving the above discussed second race condition.

In some embodiments, the timestamping discussed in various embodiments may be used to timestamp trace data (although in some other embodiments, user data or other types of data may also be timestamped in similar manner). For example, trace data may be generated and timestamped during a debugging or trouble shooting session. Such sessions may be for relatively short duration, e.g., such that there is no overflow of the source timestamp counter 301 and/or the target timestamp counter 303. For example, the number of bits of the target timestamp (e.g., the number of bits of the counter 303) may be sufficiently large to avoid any overflow of the timestamps.

However, as the counters 301 and/or 303 are running at high frequency (e.g., few hundred MHzs), for example, even at 32 bit (e.g., the combination of counters 301 and 303 is 32 bits), it may be possible to have scenarios when the counter 303 overflows.

In some embodiments, whenever the counter 303 (along with the counter 301) overflows, this overflow may cause timestamps value to be sent via an overflow message or overflow indicator to each target. For example, if there is an overflow of the counter 301, the counter 301 may be reset to zero, and an overflow indication may be transmitted by the circuitry 112 to the target 108b4 (e.g., via the NI 104b4). The overflow indication may also indicate a number of times there have been such overflows. This may allow software post-processing at the target 108b4 (or at downstream external testing arrangement), to keep track of long trace runs by counting the number of such overflow messages.

In some embodiments, if such post-processing is not desired, the bits in the counter 303 may be increased, e.g., to have sufficient bits that overflow does not usually occur during all possible durations of trace data generation. For example, the message frame may offer more than 32 bits for the counters 301 and/or 303, e.g., 64 bits to maintain a regular trace format.

Figure 7:
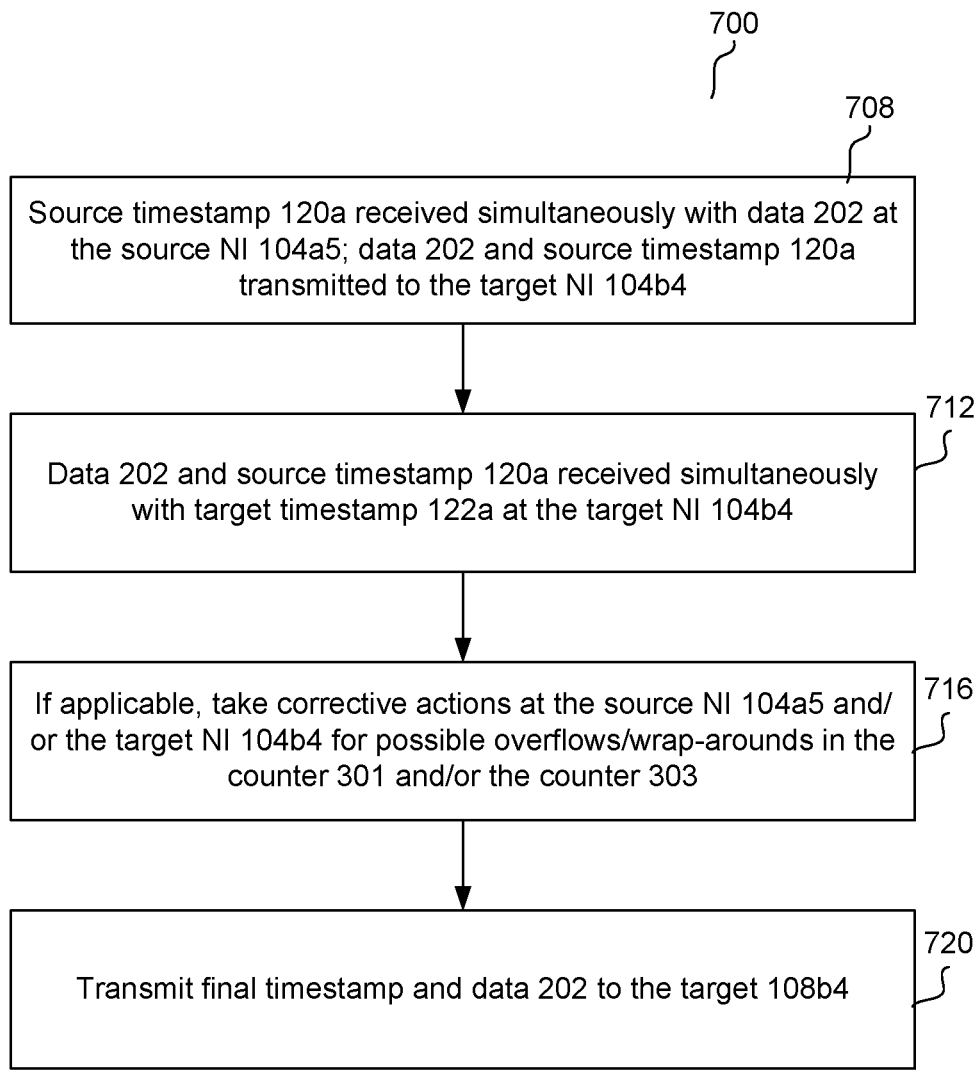
FIG. 7 illustrates a flowchart depicting a method for operating the network of FIG. 1 to implement distributed timestamping, according to some embodiments.

FIG. 7 illustrates a flowchart depicting a method 700 for operating the network 100 of FIGS. 1-6 to implement distributed timestamping, according to some embodiments. Although the blocks in the flowchart with reference to FIG. 7 are shown in a particular order, the order of the actions can be modified. Thus, the illustrated embodiments can be performed in a different order, and some actions/blocks may be performed in parallel. Some of the blocks and/or operations listed in FIG. 7 may be optional in accordance with certain embodiments. The numbering of the blocks presented is for the sake of clarity and is not intended to prescribe an order of operations in which the various blocks must occur.

Referring to the circuitries of FIGS. 1-6 and at the method 700 of FIG. 7, at 708, the source NI 104a5 receives the source timestamp 120a of the sequence 120 substantially simultaneously with the data 202. The source NI 104a5 associates the source timestamp 120a with the data 202, and transmits the source timestamp 120a and the data 202 to the target NI 104b4.

At 712, the target NI 104b4 receives the data (along with source timestamp 120a) substantially simultaneously with the target timestamp 122a of the sequence 122. The target NI 104b4 associates the target timestamp 122a with the data 202.

At 716, if applicable, corrective actions may be at the source NI 104a5 and/or the target NI 104b4 for possible overflows/wrap-arounds in the counter 301 and/or the counter 303. In an example, some of the operations at 716 may be performed at least in part along with the operations at 708.

The operations of 716 may be performed in one or more of many possible manners. For example, as discussed with respect to FIG. 6, in some embodiments, the circuitry 515 may selectively decrement the target timestamp, e.g., if the MSB of the source timestamp 120a does not match with the MSB 620a (where the MSB 620a may be received by the target NI 104b4 simultaneously with the target timestamp 122a).

In some embodiments and although not discussed with respect to FIG. 6, the circuitry 515 may selectively transmit a source timestamp overflow message (e.g., instead of decrementing the target timestamp), e.g., if the MSB of the source timestamp 120a does not match with the MSB 620a (where the MSB 620a may be received by the target NI 104b4 simultaneously with the target timestamp 122a).

In some embodiments, the corrective actions 716 for source counter 301 overflow may be performed at least in part the source NI 104a5. For example, if the MSB of the source counter 301 changes, the source NI 104a5 may generate a source timestamp overflow indicator to indicate such overflow, and transmit the source timestamp overflow indicator, along with the data 202, to the target NI 104b4. In some embodiments, upon receiving such an indicator, the target NI 104b4 may either decrement the target timestamp (e.g., as discussed with respect to FIG. 5) or may simply transmit the indicator to the target 108b4 for appropriate corrective actions.

In some embodiments, the corrective actions 716 for source counter 301 overflow may be performed at least in part at the target NI 104b4. For example, if the target timestamp counter 303 overflows (e.g., if the MSB of the target timestamp counter 303 transitions from 1 to 0, thereby resetting the counter 303), the target NI 104b4 may generate a target timestamp overflow indicator to indicate such overflow, and may transmit the target timestamp overflow indicator to the target 108b4 for appropriate corrective actions.

Variations of various principles of this disclosure may be possible. For example, in FIGS. 1-7, it has been assumed that the circuitry 112 generates the source and target timestamps. However, in some other embodiments, the counter 303 may be moved from the circuitry 112 to individual target NIs (e.g., target NI 104b4). For example, the target NI 104b4 may generate and increment such the counter 303, e.g., when the MSB of the counter 301 (e.g., MSB of the source timestamps) transitions from 1 to 0, or the counter 301 resets). In such embodiments, the target NIs may receive the sequence 120, and may generate the sequence 122 internally based on the sequence 120. A target NI may generate target timestamp overflow message, e.g., if the target NI detects a transition of the MSB of the target timestamp from 1 to 0. In some other embodiments, the sequence 122 of the target timestamp may be generated in the target 108b4 (e.g., assuming that the target 108b4 receives the sequence 120 of the source timestamps).

In some embodiments, upon a change of the MSB of the source timestamp counter 301, the target Ms may receive a source MSB change message (e.g., instead of continually receiving the source MSB), based on which the target NIs may be aware of the current MSB of the counter 301. In an example, based on such a message, the modification circuitry 515 may selectively modify the target timestamps.

In some embodiments, instead of a centralized counter 301 in the circuitry 112 generating the 120 sequence of the source timestamps and broadcasting the same to the source NIs, the 120 sequence of the source timestamps may be generated locally by individual source NIs. For example, a high frequency clock (e.g., the timestamp clock 305) may be transmitted to the source NIs, based on which the source NIs may generate the 120 sequence of the source timestamps. In some embodiments, the local source timestamp counters in the individual source NIs may be in always-on power domain, e.g., even if the source NIs may be powered down (e.g., to keep consistent source timestamp values available).

In an example, a frequency of the clock 305 may be at least as high as a maximum operating frequency of all the initiators 106 (e.g., to maintain accuracy and parallel time-stamping in the network 100). However, in some other embodiments, the frequency of the clock 305 may be lower than the operating frequency of the initiators 106 (e.g., to save power). For example, if there is a single initiator operating at a high frequency, the frequency of the clock 305 may be lower than the frequency of the single initiator.

Figure 8:
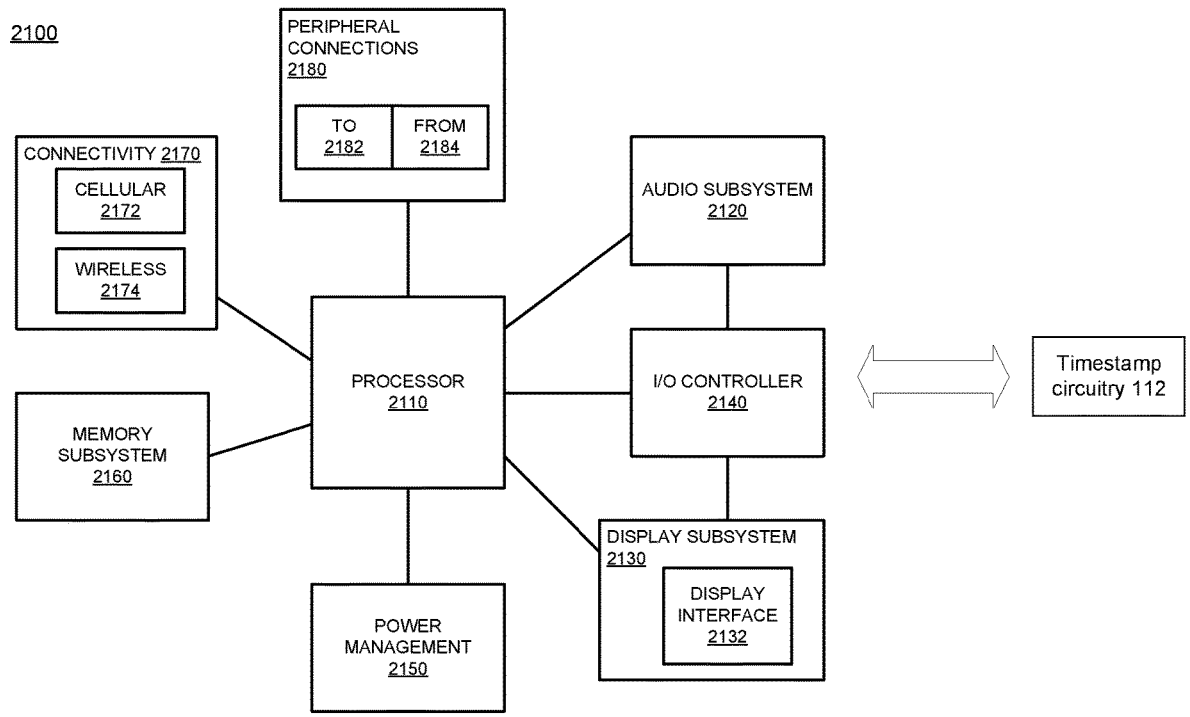
FIG. 8 illustrates a computer system, computing device or a SoC (System-on-Chip), where timestamping of events may be performed in a distributed manner, in accordance with some embodiments.

FIG. 8 illustrates a computer system, computing device or a SoC (System-on-Chip) 2100, where timestamping of events may be performed in a distributed manner, in accordance with some embodiments. It is pointed out that those elements of FIG. 8 having the same reference numbers (or names) as the elements of any other figure can operate or function in any manner similar to that described, but are not limited to such.

In some embodiments, computing device 2100 represents an appropriate computing device, such as a computing tablet, a mobile phone or smart-phone, a laptop, a desktop, an IOT device, a server, a set-top box, a wireless-enabled e-reader, or the like. It will be understood that certain components are shown generally, and not all components of such a device are shown in computing device 2100.

In some embodiments, computing device 2100 includes a first processor 2110. The various embodiments of the present disclosure may also comprise a network interface within 2170 such as a wireless interface so that a system embodiment may be incorporated into a wireless device, for example, cell phone or personal digital assistant.

In one embodiment, processor 2110 can include one or more physical devices, such as microprocessors, application processors, microcontrollers, programmable logic devices, or other processing means. The processing operations performed by processor 2110 include the execution of an operating platform or operating system on which applications and/or device functions are executed. The processing operations include operations related to I/O (input/output) with a human user or with other devices, operations related to power management, and/or operations related to connecting the computing device 2100 to another device. The processing operations may also include operations related to audio I/O and/or display I/O.

In one embodiment, computing device 2100 includes audio subsystem 2120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 2100, or connected to the computing device 2100. In one embodiment, a user interacts with the computing device 2100 by providing audio commands that are received and processed by processor 2110.

Display subsystem 2130 represents hardware (e.g., display devices) and software (e.g., drivers) components that provide a visual and/or tactile display for a user to interact with the computing device 2100. Display subsystem 2130 includes display interface 2132, which includes the particular screen or hardware device used to provide a display to a user. In one embodiment, display interface 2132 includes logic separate from processor 2110 to perform at least some processing related to the display. In one embodiment, display subsystem 2130 includes a touch screen (or touch pad) device that provides both output and input to a user.

I/O controller 2140 represents hardware devices and software components related to interaction with a user. I/O controller 2140 is operable to manage hardware that is part of audio subsystem 2120 and/or display subsystem 2130. Additionally, I/O controller 2140 illustrates a connection point for additional devices that connect to computing device 2100 through which a user might interact with the system. For example, devices that can be attached to the computing device 2100 might include microphone devices, speaker or stereo systems, video systems or other display devices, keyboard or keypad devices, or other I/O devices for use with specific applications such as card readers or other devices.

As mentioned above, I/O controller 2140 can interact with audio subsystem 2120 and/or display subsystem 2130. For example, input through a microphone or other audio device can provide input or commands for one or more applications or functions of the computing device 2100. Additionally, audio output can be provided instead of, or in addition to display output. In another example, if display subsystem 2130 includes a touch screen, the display device also acts as an input device, which can be at least partially managed by I/O controller 2140. There can also be additional buttons or switches on the computing device 2100 to provide I/O functions managed by I/O controller 2140.

In one embodiment, I/O controller 2140 manages devices such as accelerometers, cameras, light sensors or other environmental sensors, or other hardware that can be included in the computing device 2100. The input can be part of direct user interaction, as well as providing environmental input to the system to influence its operations (such as filtering for noise, adjusting displays for brightness detection, applying a flash for a camera, or other features).

In one embodiment, computing device 2100 includes power management 2150 that manages battery power usage, charging of the battery, and features related to power saving operation. Memory subsystem 2160 includes memory devices for storing information in computing device 2100. Memory can include nonvolatile (state does not change if power to the memory device is interrupted) and/or volatile (state is indeterminate if power to the memory device is interrupted) memory devices. Memory subsystem 2160 can store application data, user data, music, photos, documents, or other data, as well as system data (whether long-term or temporary) related to the execution of the applications and functions of the computing device 2100. In one embodiment, computing device 2100 includes a clock generation subsystem 2152 to generate a clock signal.

Elements of embodiments are also provided as a machine-readable medium (e.g., memory 2160) for storing the computer-executable instructions (e.g., instructions to implement any other processes discussed herein). The machine-readable medium (e.g., memory 2160) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 2170 includes hardware devices (e.g., wireless and/or wired connectors and communication hardware) and software components (e.g., drivers, protocol stacks) to enable the computing device 2100 to communicate with external devices. The computing device 2100 could be separate devices, such as other computing devices, wireless access points or base stations, as well as peripherals such as headsets, printers, or other devices.

Connectivity 2170 can include multiple different types of connectivity. To generalize, the computing device 2100 is illustrated with cellular connectivity 2172 and wireless connectivity 2174. Cellular connectivity 2172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2174 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 2180 include hardware interfaces and connectors, as well as software components (e.g., drivers, protocol stacks) to make peripheral connections. It will be understood that the computing device 2100 could both be a peripheral device ("to" 2182) to other computing devices, as well as have peripheral devices ("from" 2184) connected to it. The computing device 2100 commonly has a "docking" connector to connect to other computing devices for purposes such as managing (e.g., downloading and/or uploading, changing, synchronizing) content on computing device 2100. Additionally, a docking connector can allow computing device 2100 to connect to certain peripherals that allow the computing device 2100 to control content output, for example, to audiovisual or other systems.

In addition to a proprietary docking connector or other proprietary connection hardware, the computing device 2100 can make peripheral connections 2180 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, the computing device 2100 may comprise the timestamp circuitry 112, e.g., to be used for distributed timestamping, e.g., as discussed in this disclosure. For example, a source NI (not illustrated in FIG. 8) may transmit data (e.g., trace data, or another appropriate data) from a component (e.g., the processor 2110) of the computing device 2100 to a target NI coupled to another component (e.g., a testing arrangement not illustrated in FIG. 8). The timestamping of the data may be in accordance with the various embodiments discussed herein.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1

An apparatus comprising: a first network interface (NI) to receive data from a source; a second NI coupled to a target; and a circuitry to generate a sequence of source timestamps and a sequence of target timestamps, wherein the first NI is to receive the sequence of source timestamps, and associate a first source timestamp of the sequence of source timestamps with the data, wherein the second NI is to receive the data with the first source timestamp from the first NI and the sequence of target timestamps from the circuitry, and wherein the second NI is to generate a timestamp for the data, based at least in part on the first source timestamp and a first target timestamp of the sequence of target timestamps.

Example 2

The apparatus of example 1 or any other example, wherein: the second NI is to output the data, along with the timestamp, to the target.

Example 3

The apparatus of example 1 or any other example, wherein: the timestamp is to provide an indication of a time at which the first NI receives the data from the source.

Example 4

The apparatus of example 1 or any other example, wherein: the second NI is to generate the timestamp such that: the first source timestamp comprises one or more least significant bits (LSBs) of the timestamp, and the first target timestamp comprises one or more most significant bits (MSBs) of the timestamp.

Example 5

The apparatus of any of examples 1-4 or any other example, further comprising: one or more routers to route the data from the first NI to the second NI.

Example 6

The apparatus of any of examples 1-4 or any other example, wherein the data comprises trace data that includes information associated with one or more packets being communicated by one or both the source or the first NI.

Example 7

The apparatus of any of examples 1-4 or any other example, wherein the circuitry is to generate the sequence of source and target timestamps at a frequency that is at least as high as a clock frequency of the source.

Example 8

The apparatus of any of examples 1-4 or any other example, wherein: the apparatus comprises a third NI; the data is first data; the timestamp is a first timestamp; the second NI is to generate a second timestamp for second data received from the third NI; and the first timestamp and the second timestamp is to provide an indication of relative times at which the first data and the second data are respectively received at the first NI and the third NI.

Example 9

The apparatus of any of examples 1-4 or any other example, wherein the second NI is to: receive, substantially simultaneously: the first target timestamp of the sequence of target timestamps, and the data with the first source timestamp.

Example 10

The apparatus of any of examples 1-4 or any other example, wherein the second NI is to: modify the first target timestamp, subsequent to receiving the first target timestamp and prior to generating the timestamp.

Example 11

The apparatus of example 10 or any other example, wherein to modify the first target timestamp, the second NI is to: decrement the first target timestamp.

Example 12

The apparatus of example 10 or any other example, wherein the second NI is to: receive, for individual source timestamp of the sequence of source timestamps, a corresponding most significant bit (MSB), without receiving other bits of the individual source timestamp, such that a sequence of MSBs is received by the second NI corresponding to the sequence of source timestamps.

Example 13

The apparatus of example 12 or any other example, wherein to modify the first target timestamp, the second NI is to: receive, substantially simultaneously: the first target timestamp of the sequence of target timestamps and a first MSB of the sequence of MSBs; compare a MSB of the first source timestamp with the first MSB; and in response to the MSB of the first source timestamp differing from the first MSB, modify the first target timestamp.

Example 14

A system comprising: a memory to store instructions; a processor coupled to the memory; a wireless interface coupled to the processor, the wireless interface to transmit and receive signals wirelessly; and a first interface and a second interface, the first interface to receive one or more packets from the processor or another component of the system, and transmit the one or more packets to the second interface, wherein the second interface is to generate a timestamp that is indicative of a time at which the first interface receives the one or more packets, wherein the second interface is to receive one or more Least Significant Bits (LSBs) of the timestamp, along with the one or more packets, from the first interface, and wherein the second interface is to receive one or more Most Significant Bits (MSBs) of the timestamp from a circuitry that is different from the first interface.

Example 15

The system of example 14 or any other example, wherein: the first interface is to receive the LSBs from the circuitry substantially simultaneously with receiving the one or more packets from the processor or another component of the system.

Example 16

The system of example 14 or any other example, wherein: the second interface is to decrement the MSBs of the timestamp, subsequent to receiving the MSBs of the timestamp from the circuitry and prior to generating the timestamp.

Example 17

A method comprising: receiving, by a first network interface, a packet substantially simultaneously with receiving a first section of a timestamp; transmitting, by the first network interface, the packet and the first section of the timestamp to a second network interface; receiving, by the second network interface, the packet and the first section of the timestamp substantially simultaneously with receiving a second section of the timestamp; and generating, by the second network interface, the timestamp, based on the first and second sections.

Example 18

The method of example 17 or any other example, wherein generating the timestamp comprises: generating, by the second network interface, the timestamp such that: the first section forms one or more least significant bits (LSBs) of the timestamp, and the second section forms one or more most significant bits (LSBs) of the timestamp.

Example 19

The method of example 17 or any other example, further comprising: generating, by a circuitry, the first section of the timestamp and the second section of the timestamp; and transmitting, by the circuitry, the first section of the timestamp to the first network interface and the second section of the timestamp to the second network interface.

Example 20

The method of any of examples 17-19 or any other example, further comprising: modifying, by the second network interface, the second section of the timestamp, prior to generating the timestamp.

Example 21

An apparatus comprising: means for performing the method in any of the examples 17-20 or any other example.

Example 22

Non-transitory computer-readable storage media to store instructions that, when executed by a processor, cause the processor to: receive, at a first network interface, a packet substantially simultaneously with receiving a first section of a timestamp; transmit, from the first network interface, the packet and the first section of the timestamp to a second network interface; receive, at the second network interface, the packet and the first section of the timestamp substantially simultaneously with receiving a second section of the timestamp; and generate, at the second network interface, the timestamp, based on the first and second sections.

Example 23

The non-transitory computer-readable storage media of example 22 or any other example, wherein to generate the timestamp, the instructions cause the processor to: generate, at the second network interface, the timestamp such that: the first section forms one or more least significant bits (LSBs) of the timestamp, and the second section forms one or more most significant bits (LSBs) of the timestamp.

Example 24

The non-transitory computer-readable storage media of example 22 or any other example, wherein the instructions, when executed, further cause the processor to: generate, at a circuitry, the first section of the timestamp and the second section of the timestamp; and transmit, from the circuitry, the first section of the timestamp to the first network interface and the second section of the timestamp to the second network interface.

Example 25

The non-transitory computer-readable storage media of any of examples 22-24 or any other example, wherein the instructions, when executed, further cause the processor to: modify, at the second network interface, the second section of the timestamp, prior to generating the timestamp.

Example 26

An apparatus comprising: means for receiving, at a first network interface, a packet substantially simultaneously with receiving a first section of a timestamp; means for transmitting, from the first network interface, the packet and the first section of the timestamp to a second network interface; means for receiving, at the second network interface, the packet and the first section of the timestamp substantially simultaneously with receiving a second section of the timestamp; and means for generating, at the second network interface, the timestamp, based on the first and second sections.

Example 27

The apparatus of example 26 or any other example, wherein the means for generating the timestamp comprises: means for generating, at the second network interface, the timestamp such that: the first section forms one or more least significant bits (LSBs) of the timestamp, and the second section forms one or more most significant bits (LSBs) of the timestamp.

Example 28

The apparatus of example 26 or any other example, further comprising: means for generating, at a circuitry, the first section of the timestamp and the second section of the timestamp; and means for transmitting, from the circuitry, the first section of the timestamp to the first network interface and the second section of the timestamp to the second network interface.

Example 29

The apparatus of any of examples 26-28 or any other example, further comprising: means for modifying, at the second network interface, the second section of the timestamp, prior to generating the timestamp.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
a first network interface (NI) to receive data from a source;
a second NI coupled to a target; and
a circuitry to generate a sequence of source timestamps and a sequence of target timestamps,
wherein the first NI is to receive the sequence of source timestamps, and associate a first source timestamp of the sequence of source timestamps with the data,
wherein the second NI is to receive: the data with the first source timestamp from the first NI, and the sequence of target timestamps from the circuitry, and
wherein the second NI is to generate a timestamp for the data, based at least in part on the first source timestamp and a first target timestamp of the sequence of target timestamps.

2. The apparatus of claim 1, wherein:
the second NI is to output the data, along with the timestamp, to the target.

3. The apparatus of claim 1, wherein:
the timestamp is to provide an indication of a time at which the first NI receives the data from the source.

4. The apparatus of claim 1, wherein:
the second NI is to generate the timestamp such that:
the first source timestamp comprises one or more least significant bits (LSBs) of the timestamp, and
the first target timestamp comprises one or more most significant bits (MSBs) of the timestamp.

5. The apparatus of claim 1, further comprising:
one or more routers to route the data from the first NI to the second NI.

6. The apparatus of claim 1, wherein the data comprises trace data that includes information associated with one or more packets being communicated by one or both the source or the first NI.

7. The apparatus of claim 1, wherein the circuitry is to generate the sequence of source and target timestamps at a frequency that is at least as high as a clock frequency of the source.

8. The apparatus of claim 1, wherein:
the apparatus comprises a third NI;
the data is first data;
the timestamp is a first timestamp;
the second NI is to generate a second timestamp for second data received from the third NI; and
the first timestamp and the second timestamp is to provide an indication of relative times at which the first data and the second data are respectively received at the first NI and the third NI.

9. The apparatus of claim 1, wherein the second NI is to:
receive, substantially simultaneously: the first target timestamp of the sequence of target timestamps, and the data with the first source timestamp.

10. The apparatus of claim 1, wherein the second NI is to:
modify the first target timestamp, subsequent to receiving the first target timestamp and prior to generating the timestamp.

11. The apparatus of claim 10, wherein to modify the first target timestamp, the second NI is to:
decrement the first target timestamp.

12. The apparatus of claim 10, wherein the second NI is to:
receive, for individual source timestamp of the sequence of source timestamps, a corresponding most significant bit (MSB), without receiving other bits of the individual source timestamp, such that a sequence of MSBs is received by the second NI corresponding to the sequence of source timestamps.

13. The apparatus of claim 12, wherein to modify the first target timestamp, the second NI is to:
receive, substantially simultaneously: the first target timestamp of the sequence of target timestamps and a first MSB of the sequence of MSBs;
compare a MSB of the first source timestamp with the first MSB; and
in response to the MSB of the first source timestamp differing from the first MSB, modify the first target timestamp.

14. A system comprising:
a memory to store instructions;
a processor coupled to the memory;
a wireless interface coupled to the processor, the wireless interface to transmit and receive signals wirelessly; and
a first interface and a second interface, the first interface to receive one or more packets from the processor or another component of the system, and transmit the one or more packets to the second interface,
wherein the second interface is to generate a timestamp that is indicative of a time at which the first interface receives the one or more packets,
wherein the second interface is to receive one or more Least Significant Bits (LSBs) of the timestamp, along with the one or more packets, from the first interface, and
wherein the second interface is to receive one or more Most Significant Bits (MSBs) of the timestamp from a circuitry that is different from the first interface.

15. The system of claim 14, wherein:
the first interface is to receive the LSBs from the circuitry substantially simultaneously with receiving the one or more packets from the processor or another component of the system.

16. The system of claim 14, wherein:
the second interface is to decrement the MSBs of the timestamp, subsequent to receiving the MSBs of the timestamp from the circuitry and prior to generating the timestamp.

17. A method comprising:
receiving, by a first network interface, a packet substantially simultaneously with receiving a first section of a timestamp;
transmitting, by the first network interface, the packet and the first section of the timestamp to a second network interface;

receiving, by the second network interface, the packet and the first section of the timestamp substantially simultaneously with receiving a second section of the timestamp; and generating, by the second network interface, the timestamp, based on the first and second sections.

18. The method of claim 17, wherein generating the timestamp comprises:

generating, by the second network interface, the timestamp such that: the first section forms one or more least significant bits (LSBs) of the timestamp, and the second section forms one or more most significant bits (LSBs) of the timestamp.

19. The method of claim 17, further comprising:

generating, by a circuitry, the first section of the timestamp and the second section of the timestamp; and transmitting, by the circuitry, the first section of the timestamp to the first network interface and the second section of the timestamp to the second network interface.

20. The method of claim 17, further comprising:

modifying, by the second network interface, the second section of the timestamp, prior to generating the timestamp.

* * * * *